(12) United States Patent
Chen

(10) Patent No.: US 7,647,669 B2
(45) Date of Patent: Jan. 19, 2010

(54) WINDSHIELD WIPER BLADE ASSEMBLY

(75) Inventor: Chung-Fu Chen, Taipei (TW)

(73) Assignee: Hai Rwei Heng Enterprise Co., Ltd., Taipei (TW)

( * ) Notice: Subject to any disclaimer, the term of this patent is extended or adjusted under 35 U.S.C. 154(b) by 885 days.

(21) Appl. No.: 11/359,596

(22) Filed: Feb. 23, 2006

(65) Prior Publication Data

US 2007/0192983 A1    Aug. 23, 2007

(51) Int. Cl.
*B60S 1/38* (2006.01)
*B60S 1/32* (2006.01)

(52) U.S. Cl. ............ 15/250.46; 15/250.44; 15/250.361; 15/250.452

(58) Field of Classification Search .............. 15/250.44, 15/250.361, 250.43, 250.201, 250.451, 250.452, 15/250.46
See application file for complete search history.

(56) References Cited

U.S. PATENT DOCUMENTS

| 2,651,800 | A | * | 9/1953 | Picon | 15/250.43 |
| 2,847,694 | A | * | 8/1958 | Chambers | 15/250.43 |
| 2006/0162114 | A1 | * | 7/2006 | Hoshino | 15/250.47 |
| 2006/0179597 | A1 | * | 8/2006 | Hoshino et al. | 15/250.43 |

* cited by examiner

*Primary Examiner*—Gary K Graham
(74) *Attorney, Agent, or Firm*—Leong C. Lei

(57) ABSTRACT

A novel blade assembly for windshield wipers is provided herein. The blade assembly mainly contains a number of tubular segments cascaded in series by a number of connectors. At least a flexible strip is threaded through the series-connected tubular segments to provide even distribution of pressure against the windshield. Each connector has a body for sticking into the two neighboring tubular segments so as to cascade the two tubular segments together. The body of the connectors has at least a through channel for the flexible strip's passing through. The aperture of the through channel decreases from the two ends towards the center of the body, making the blade assembly easier to bend and more conforming to the windshield's curvature.

7 Claims, 8 Drawing Sheets

WINDSHIELD WIPER BLADE ASSEMBLY

BACKGROUND OF THE INVENTION (a) Technical Field of the Invention

The present invention generally relates to windshield wiper blades, and more particularly to a blade assembly providing even distribution of pressure against the windshield.

(b) Description of the Prior Art

As shown in FIG. 10, a conventional windshield wiper blade assembly contains a large arm 91 and a number of medium and small arms 92 and 93. The large arm 91 has an attachment element 911 for connection to the windshield wiper arm (not shown); while the small arms 93 jointly support a rubber strip. The problem with the conventional blade assembly is that a series of arms branch out from the middle like a tree, so the rubber strip is actually connected in several places, causing uneven distribution of pressure against the windshield and leaving streaks when the blade assembly is in operation.

SUMMARY OF THE INVENTION

The primary purpose of the present invention is to provide a novel blade assembly for windshield wipers to provide streak-free operation.

The blade assembly mainly contains a number of tubular segments cascaded in series into an elongated bar by a number of connectors. A number of holders are joined to the tubular segments for the attachment of the rubber strip. At least a flexible strip is threaded through the elongated bar to provide even distribution of pressure against the windshield.

Each tubular segment has a C-shaped cross section, and is partitioned along the length into a channel and an I-shaped track. Each connector has a body for sticking into the channels of two neighboring tubular segments so as to cascade the two tubular segments together. The body of the connectors has at least a through channel for the flexible strip's passing through. The aperture of the through channel decreases from the two ends towards the center of the body. This makes the flexible strip and therefore the blade assembly easier to bend and more conforming to the windshield's curvature.

Each holder contains an I-shaped portion and a U-shaped portion. The I-shaped portion allows a holder to slide into the I-shaped track of the tubular segments, leaving the U-shaped portion outside of the tubular opening. The rubber strip is installed by threading through the U-shaped portions of the holders.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
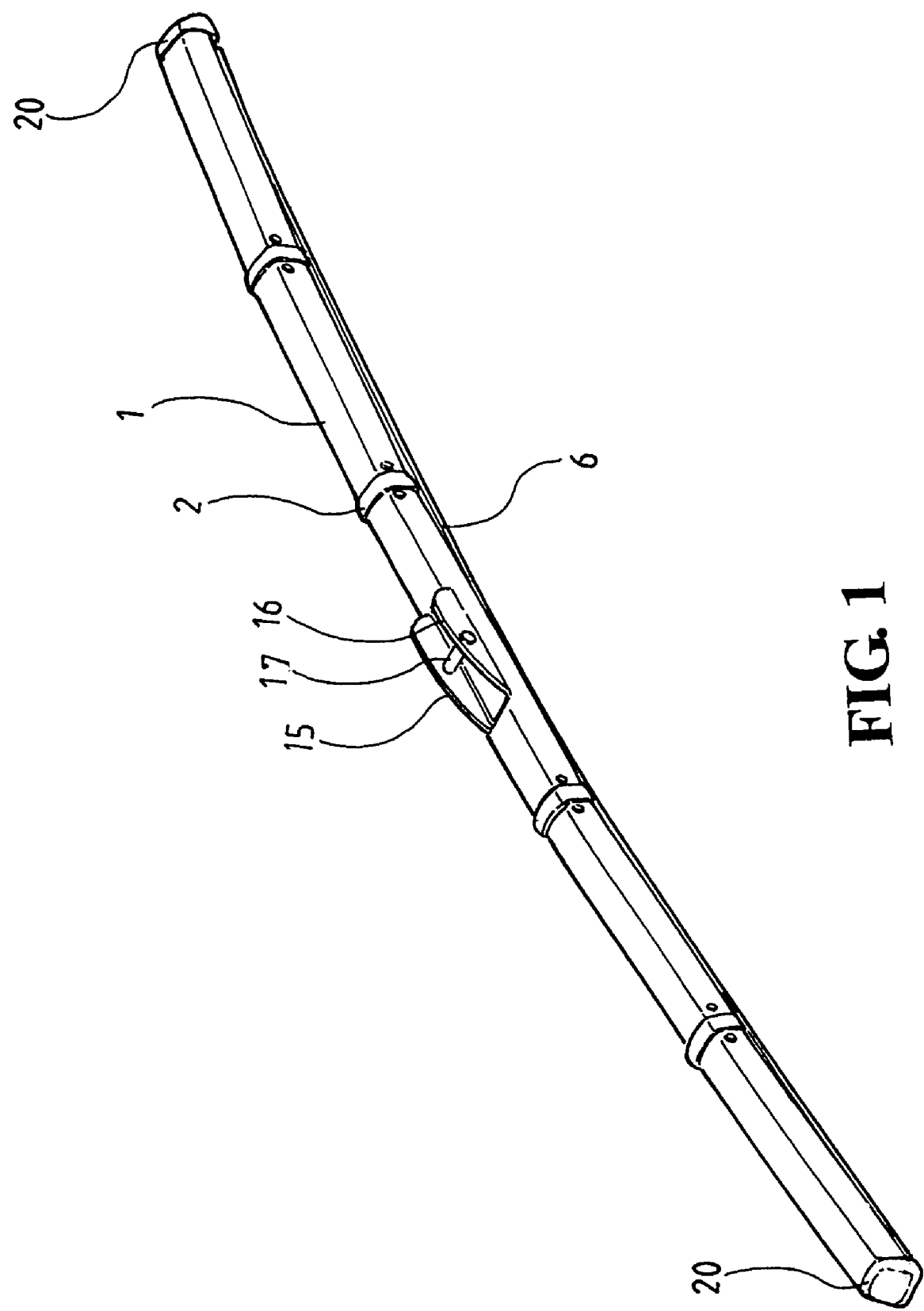
FIG. 1 is a perspective view showing a blade assembly according to an embodiment of the present invention.
Figure 2:
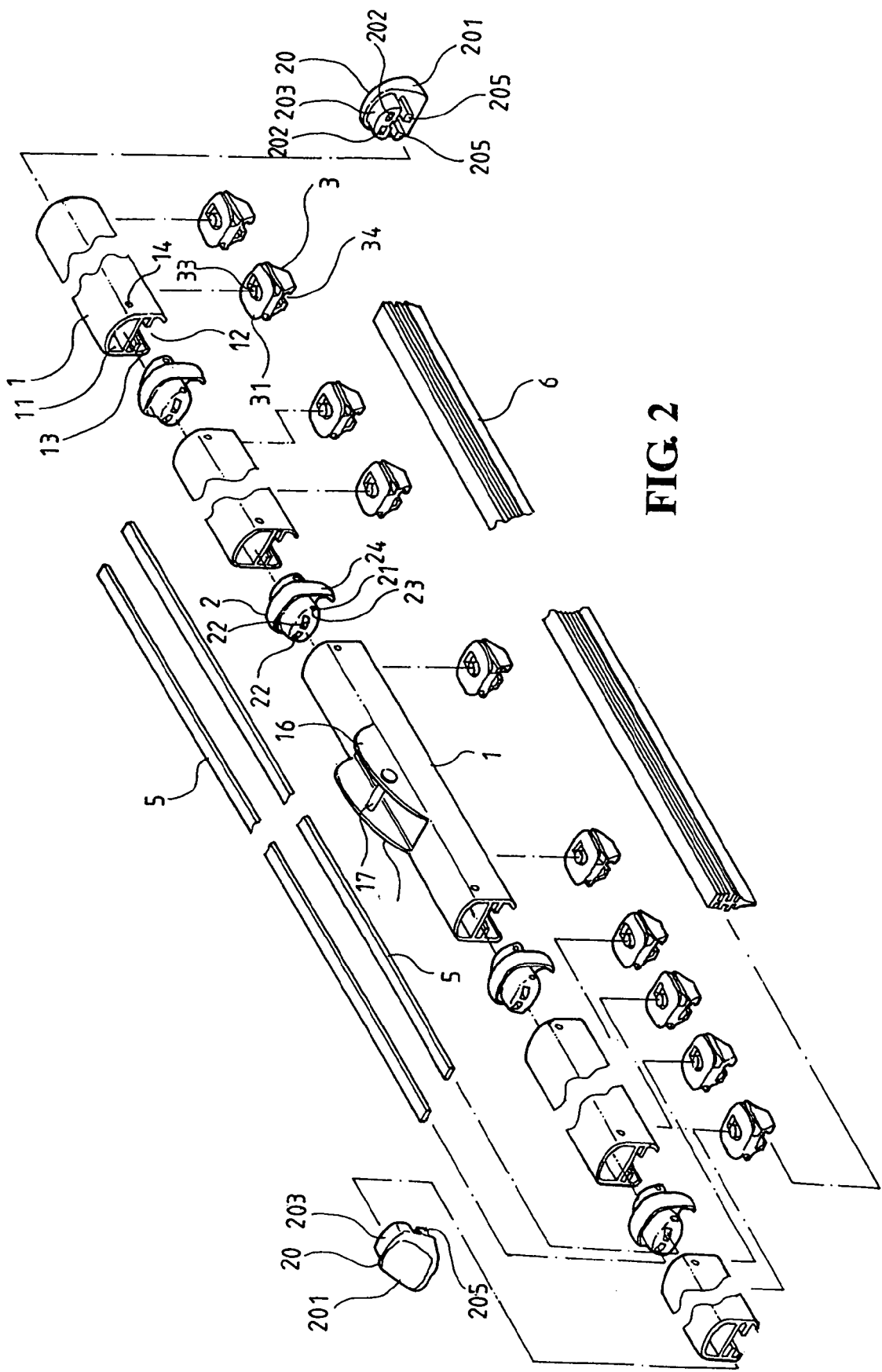
FIG. 2 is a perspective exploded view showing the various components of the blade assembly of FIG. 1.
Figure 3:
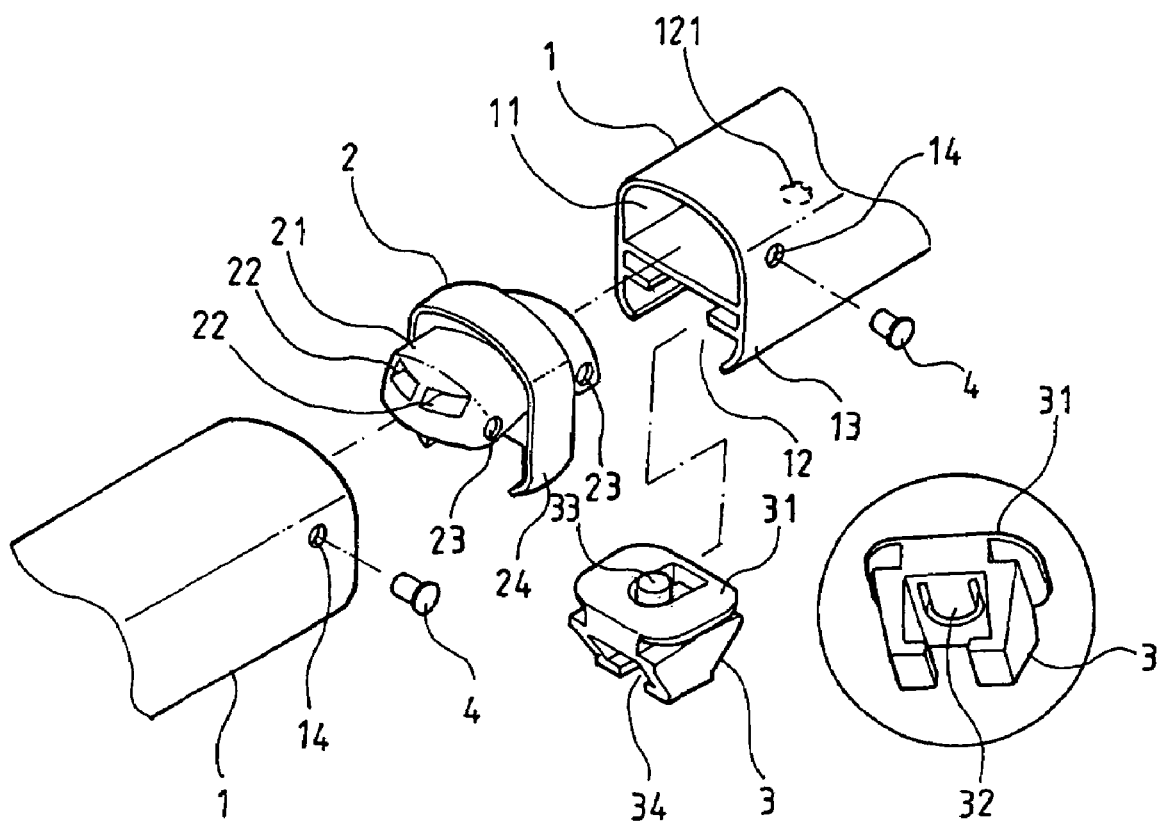
FIG. 3 is a perspective view showing the details of interconnecting two tubular segments of FIG. 1.
Figure 4:
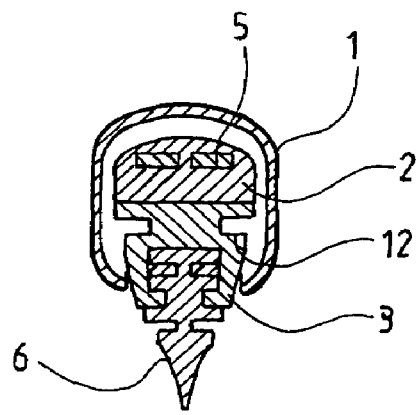
FIG. 4 is a cross-sectional view showing the tubular segment of FIG. 1.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The blade assembly according to an embodiment of the present invention, as shown in FIGS. 1 to 4, mainly contains a number of tubular segments 1, a number of connectors 2, a number of holders 3, and two end caps 20. The wall 13 of each tubular segment 1 has a slot opening (not numbered), running along the length, and each tubular segment therefore has a C-shaped cross section. The internal space of each tubular segment 1 is appropriately partitioned along the length into a closed channel 11 and an I-shaped track 12 exposed by the slot opening. On each end of the tubular segments 1, a through hole 14 is provided on the wall 13. For the one tubular segment 1 to be arranged in the middle of the blade assembly, a pair of parallel semicircular plates 15 and 16 is provided along the tubular segment, with a pin 17 connecting the plates 15 and 16. The plates 15, 16 and the pin 17 are for the attachment of the blade assembly to a wiper arm.

The connectors 2 are for cascading the tubular segments 1 into an elongated bar. Each connector 2 has a body 21 and a C-shaped collar 24 surrounding the middle section of the body 21. The two ends of the body 21 at the two sides of the collar 24 are embedded into the channels 11 of two neighboring tubular segments 1 respectively, thereby joining the two tubular segments 1 together. The two ends of the body 21 have holes 23 matching the through holes 14 of the tubular segments so that small pins 4 can be used to lock the connector 2 and the neighboring tubular segments 1 together via the matched holes 23 and 14. The channels 11 of the two neighboring tubular segments 1 are funneled together via two through channels 22 on the body 21. The collar 24 wraps around the interconnected ends of the two tubular segments 1.

The holders 3 are for attaching a rubber strip 6 to the elongated bar assembled by the tubular segments 1 and the connectors 2. Each holder 3 has an I-shaped portion 31 and a U-shaped portion 32. The I-shaped portion 31 is compatible to the I-shaped track 12 so that a holder 3 can have its I-shaped portion 31 slid into the track 12 of a tubular segment 1 while leaving the U-shaped portion 32 outside of the tubular segment 1 via the slot opening. Please note that, along the partition (not numbered) separating the channel 11 and the track 12 inside a tubular segment 1, at least a through hole 121 is provided. On the other hand, each holder 3 has a small pin 33 sticking out a surface of the I-shaped portion 31 that interfaces with the partition of the tubular segment 1. The small pin 33 is configured on a suspended U-shaped plate 32 of the U-shaped body 32. As such, when a holder 3 is slid through the track 12 of a tubular segment 1 until the holder 3 is right next to the through hole 121, the small pin 33 is stuck out by the plate 32 into the through hole 121, therefore fixing the holder 3 at that position.

Figure 6:
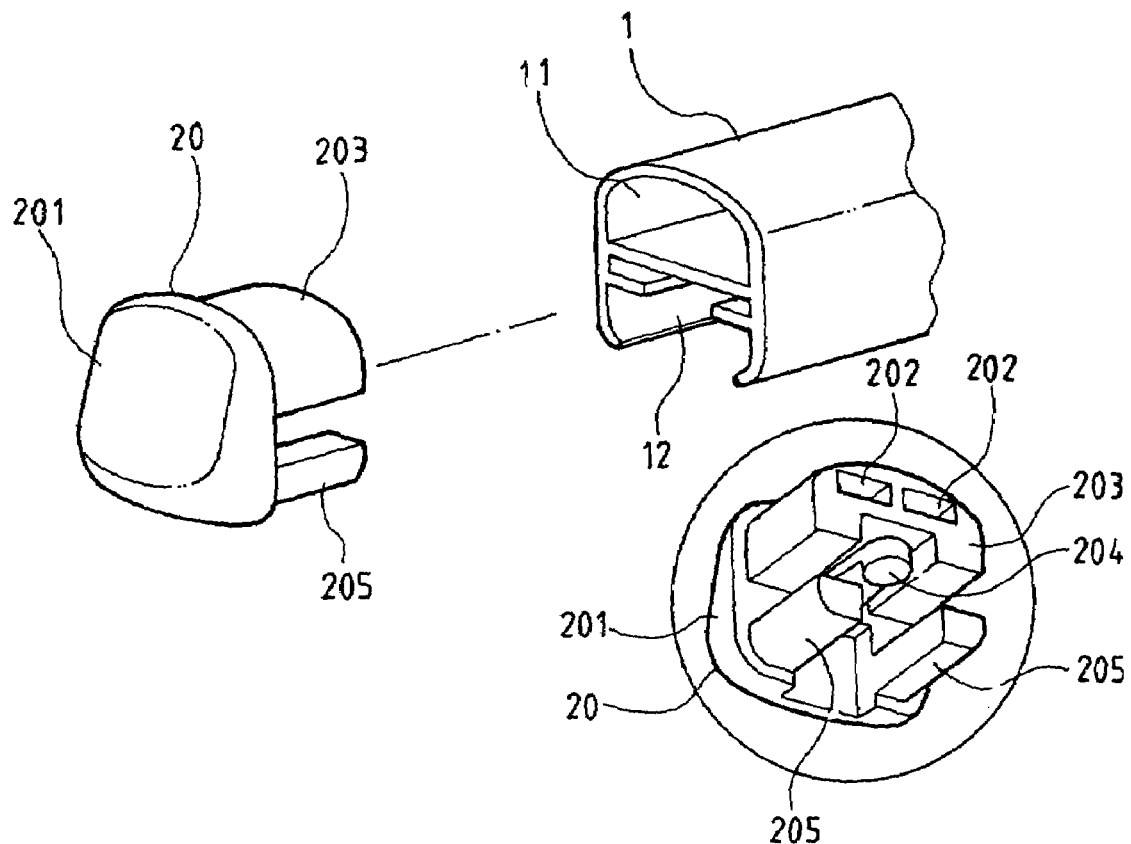
FIG. 6 is a perspective view showing the end cap of FIG. 1.
Figure 7:
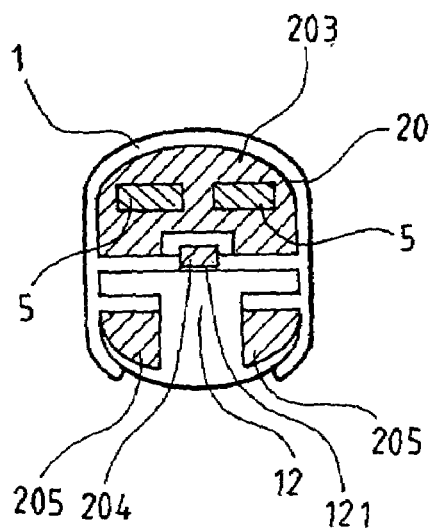
FIG. 7 is a cross-sectional view showing the end cap of FIG. 1.

Please also refer to FIGS. 6 and 7. The two end caps 20 are for plugging into the two ends of the elongated bar assembled by the tubular segments 1 and the connectors 2, respectively. Each end cap 20 has a body 201 covering up the entire cross section of a tubular segment 1. A plug 203 having a compatible shape of the channel 11 and two small rods 205 are extended from a side of the body 201. The plug 203 has two holes 202 compatible in shape and in alignment with the through channels 22 of the connectors 2. The plug 203 also contains a small suspended pin 204 so that, when the plug 203 is squeeze into the channel 11 of a tubular segment 1, the small pin 204 is stuck into the through hole 121 on the partition, and the two small rods 205 are stuck into the I-shaped track 12.

A blade assembly according to the present embodiment is assembled as follows. First, for each tubular segments 1 making up the blade assembly, at least a holder 3 is slid into the I-shaped track 12 until it reaches an appropriate location where the small pin 33 is stuck into the through hole 121 on the partition of the tubular segment 1. Then, these tubular segments 1 are cascaded together by the connectors 2. The body 21 of each connector 2 is squeezed into the channels 11 of the two neighboring segments 1. Two small pins 4 are driven into the two holes 23 on the body 21 via the two through holes 14 on the two neighboring segments 1, so that the connector 2 and the two neighboring segments 1 are reliably locked together. Then, after the tubular segments 1 are cascaded into an elongated bar, two flexible strips 5 of appropriate length are threaded through the aligned channels 22 of the connector 2 from one end of the elongated bar to the other end. The purpose of having the flexible strips 5 is to provide the required flexibility for the blade assembly. Finally, the rubber strip 6 is threaded through the aligned U-shaped portions 34 of the holders 3, and the two end caps 20 are installed to the two ends of the elongated bar, with the ends of the two flexible strips 5 buried inside the two holes 202 of the end caps 20. The completed blade assembly then can be connected to the wiper arm via the attachment element made by the plates 15, 16, and the pin 17 on the tubular segment 1 in the middle of the elongated bar.

Please note that the C-shaped cross section of the tubular segment 1, with its wall roughly bended inward along the slot opening, help preventing aerodynamic lift when running under high speed.

Figure 5:
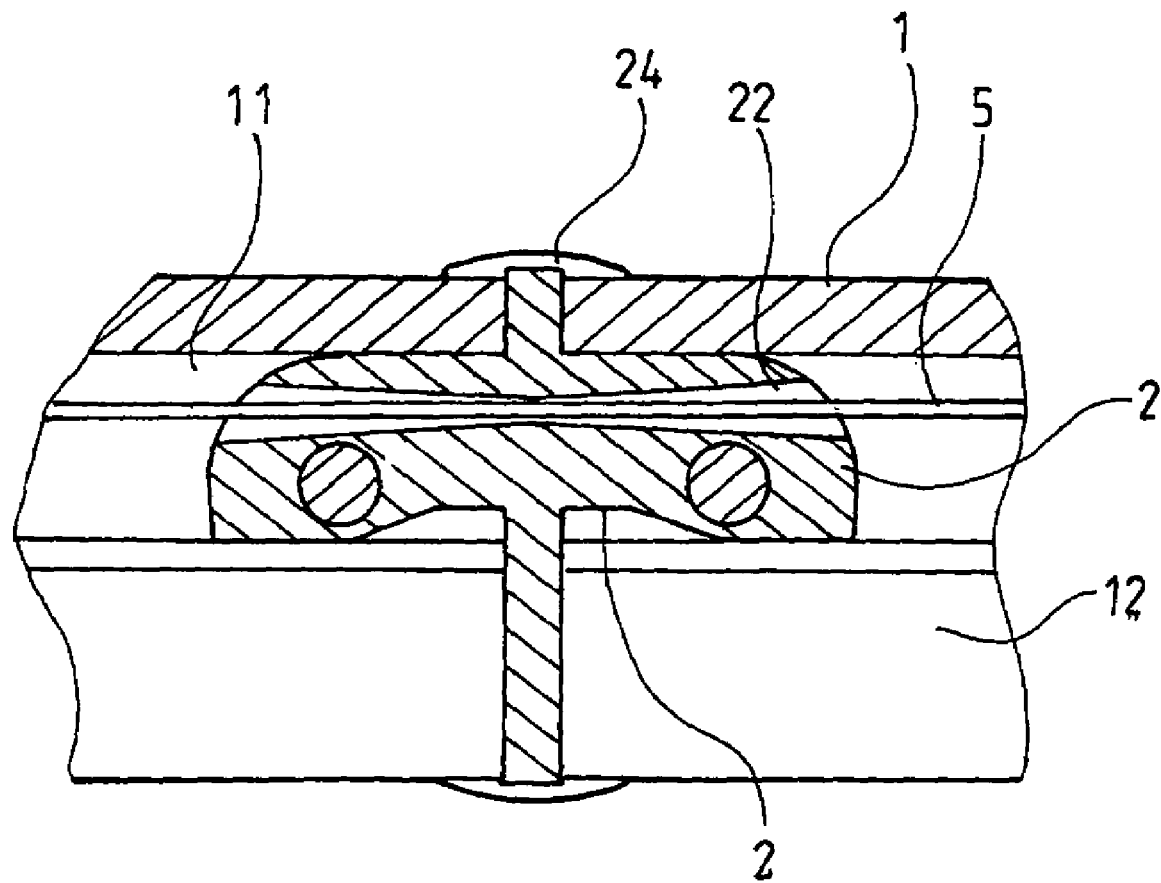
FIG. 5 is a sectional view showing the details of interconnecting two tubular segments of FIG. 1.

As shown in FIG. 5, the aperture of the through channels 22 of the connectors 2 gradually decrease from the two ends towards the center of the body 21. As such, the threaded flexible strips 5 are easier to bend and able to provide more evenly distributed pressure against the windshield, so as to prevent forming streaks when the blade assembly is in operation.

Figure 8:
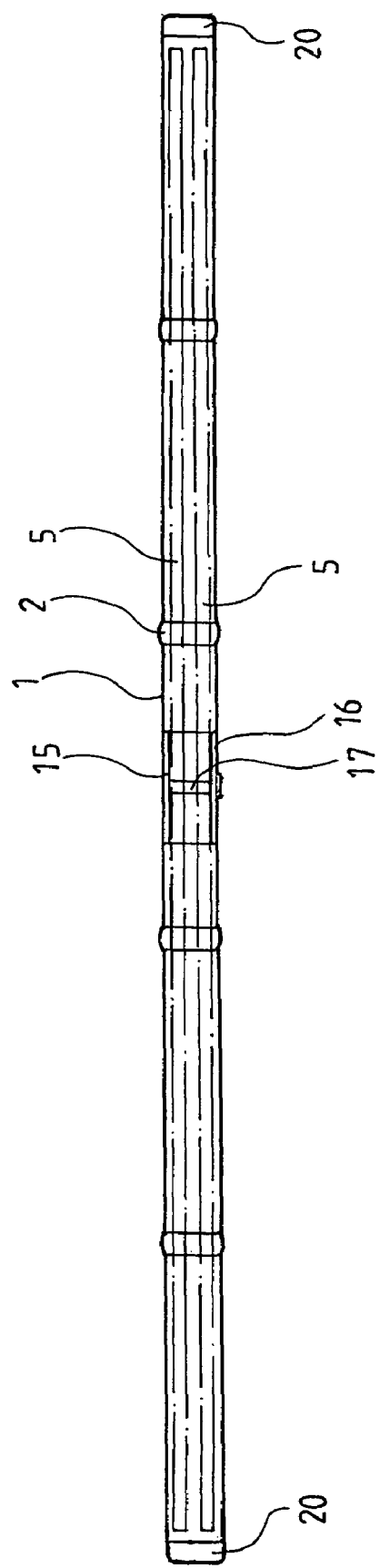
FIG. 8 is a top view showing the blade assembly of FIG. 1.
Figure 9:
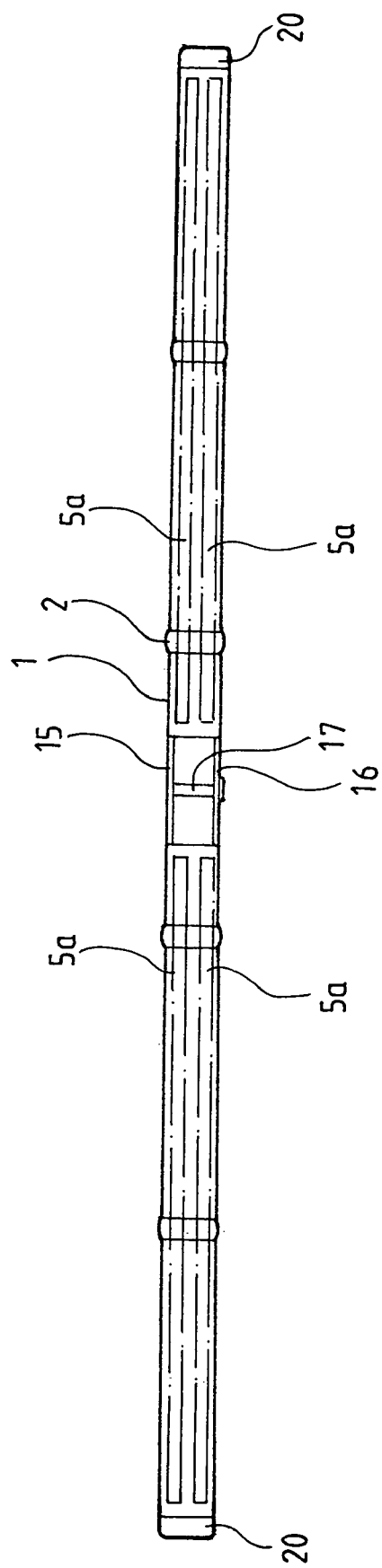
FIG. 9 is a top view showing a blade assembly according to another embodiment of the present invention.
Figure 10:
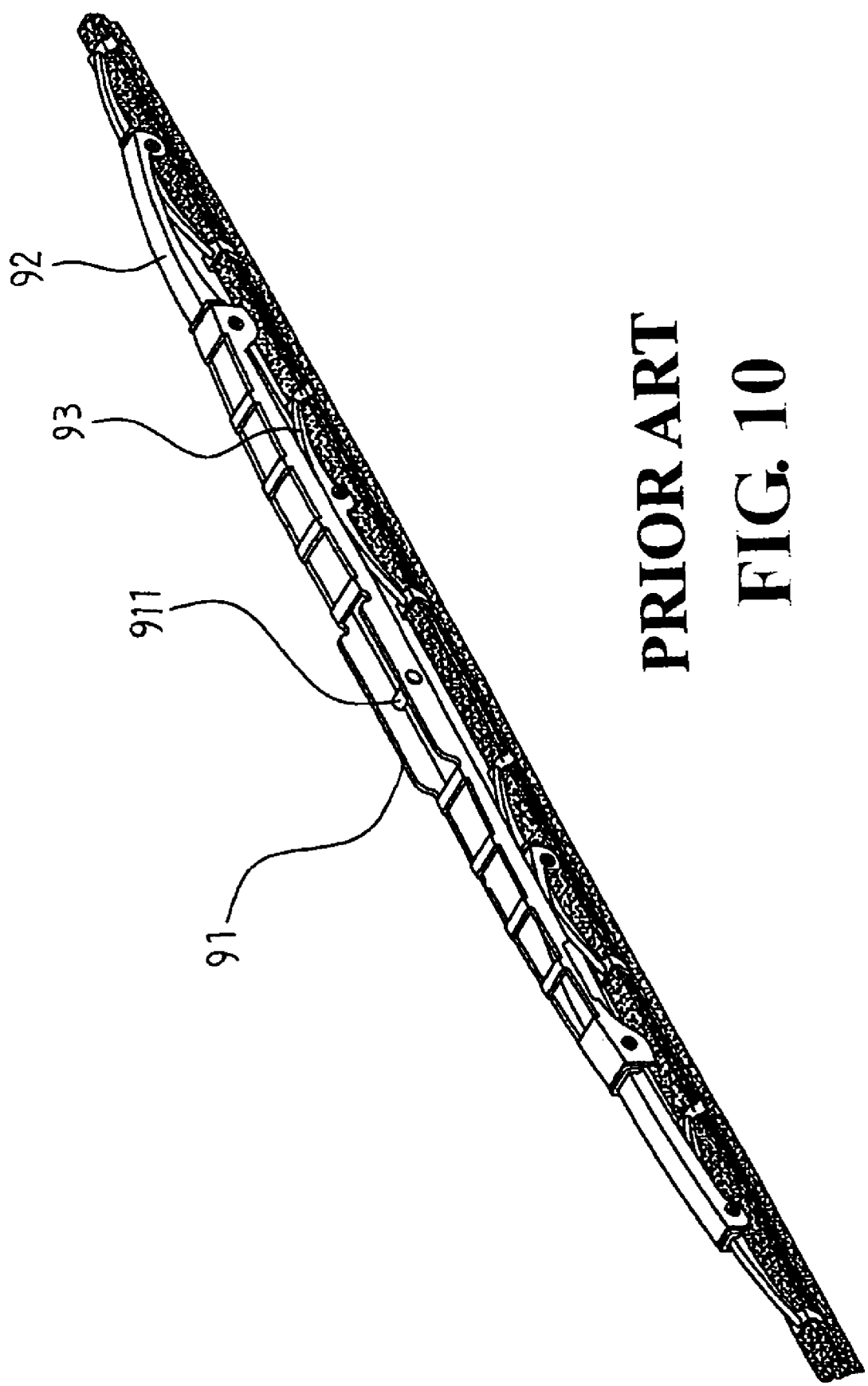
FIG. 10 is a perspective view showing a conventional blade assembly.

Each flexible strip 5 can be a single elongated strip, running from one end of the blade assembly to the other end, as shown in FIG. 8. In an alternative embodiment, as shown in FIG. 9, shorter flexible strips 5a whose length is roughly one half of the blade assembly are used.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A blade assembly connected to a windshield wiper arm and holding a rubber strip, comprising
    a plurality of tubular segments, each tubular segment having a slot opening along the length, thereby forming a C-shaped cross section, each tubular segment having a partition along the length, thereby separating the internal space of each tubular segment into a channel and an I-shaped track, said I-shaped track being exposed by said slot opening;
    a plurality of connectors, each having a body in which at least a through channel is configured,
    a plurality of holders, each having an I-shaped portion and a U-shaped portion;
    at least a flexible strip of appropriate length; and
    two end caps;
    wherein said tubular segments are series-connected into an elongated bar by said connectors; said body of each connector is squeezed into said channels of two neighboring tubular segments; said flexible strip is threaded through said through channels of said connectors; said holders are joined to said tubular segments by sliding said I-shaped portion into said I-shaped track; said rubber strip is threaded through said U-shaped portions of said holders; and said two end caps are installed to the two outmost ends of said tubular segments.

2. The blade assembly according to claim 1, wherein the wall of each tubular segment is configured with two through holes at appropriate locations adjacent to the two ends of said tubular segment respectively; said body of each connector is configured with two corresponding holes; a small pin is inserted into each hole of said body via a corresponding through hole on a tubular segment.

3. The blade assembly according to claim 1, wherein each holder has a small pin sticking out of a surface of said I-shaped portion that interfaces with said partition of a tubular segment; said small pin is configured on a suspended U-shaped plate of said U-shaped body so that, when a holder is slid through said track of a tubular segment, said small pin is stuck out by said U-shaped plate into a through hole on said partition.

4. The blade assembly according to claim 1, wherein the aperture of said through channel of each connector, decreases from the two ends of said through channel towards a center thereof.

5. The blade assembly according to claim 1, wherein the wall of each tubular segment is roughly bended inward along the slot opening so as to prevent aerodynamic lift.

6. The blade assembly according to claim 1, wherein said appropriate length of said flexible strip is either roughly equal to the length of said elongated bar, or roughly one half of said elongated bar.

7. The blade assembly according to claim 1, wherein each end cap has a body covering up an end of a tubular segment; a plug and two small rods are extended from a side of said body; said plug contains a small suspended pin so that, when said plug is squeezed into said channel of a tubular segment, said small pin is stuck into a through hole on said partition; and said two small rods are stuck into said I-shaped track.

* * * * *